Feb. 25, 1930.   A. J. SEYMOUR   1,748,802
ELECTRICAL WINDING
Filed March 24, 1926
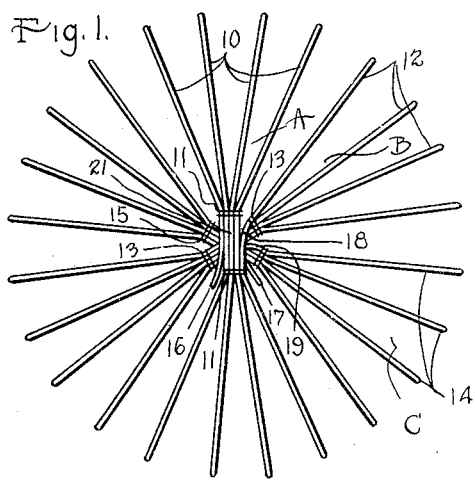
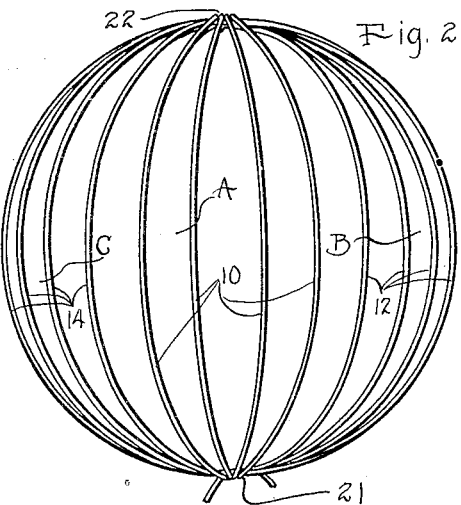
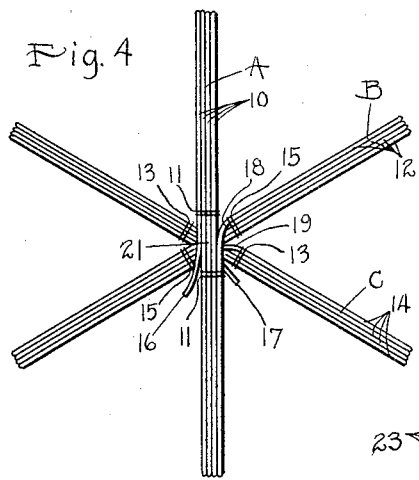
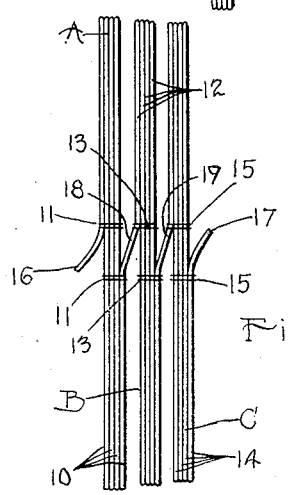
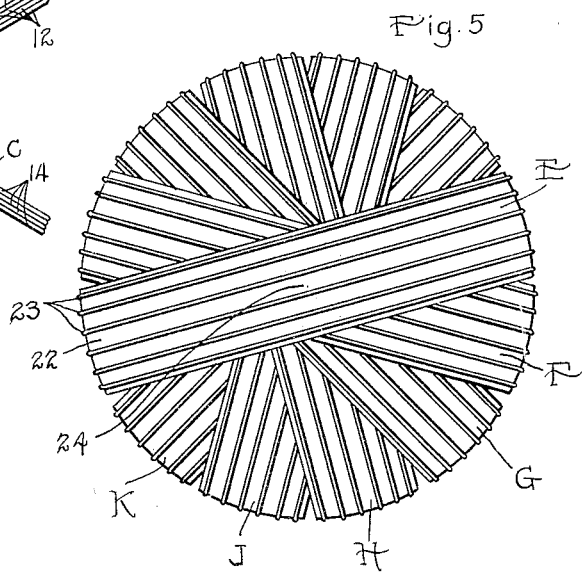
Inventor
Arthur J. Seymour
By Bradbury + Caswell
Attorneys Patented Feb. 25, 1930

1,748,802

UNITED STATES PATENT OFFICE

ARTHUR J. SEYMOUR, OF ST. PAUL, MINNESOTA, ASSIGNOR OF ONE-HALF TO GEORGE H. RIEBETH, OF MINNEAPOLIS, MINNESOTA

ELECTRICAL WINDING

Application filed March 24, 1926. Serial No. 97,022.

My invention relates to electrical windings and the method of forming the same, and particularly to windings used in radio circuits where a number of convolutions are employed which cross each other in close proximity.

An object of the invention is to provide a winding in which the field thereof is confined so as to reduce the interlinking of magnetic flux of one winding in the circuit with an adjacent winding and in which the capacity between the convolutions of the winding is a minimum.

Another object of the invention resides in forming said winding so as to be of a minimum thickness where the convolutions thereof cross one another.

A still further object resides in forming and arranging the convolutions of the winding so that the winding may be constructed without the use of a permanent core.

Another object of the invention resides in arranging the convolutions of said windings in grouped helical formation with said convolutions arranged along the surface of a sphere, all of the various groups crossing each other at one locality upon the surface of said sphere.

An object of the invention resides in the method of forming the winding which consists first in winding a number of groups of interconnected convolutions in helical formation, second in securing said convolutions together at diametrally disposed portions thereof, third in inserting said groups of convolutions one within the other in angular relation, with the secured portions thereof overlapping and fourth in spreading apart the unsecured portions of the individual convolutions to uniformly distribute the convolutions along the surface of the sphere.

With the foregoing and other objects in view, which will appear in the following description, the invention resides in the novel combination and arrangement of parts and in the details of construction hereinafter described and claimed.

In the drawings:

Fig. 1 is a side elevational view of a winding illustrating an embodiment of my invention.

Fig. 2 is a plan view of the structure shown in Fig. 1.

Fig. 3 is a side elevational view of the winding illustrating the groups of convolutions prior to rearrangement thereof.

Fig. 4 is a side elevational view of the winding after the groups of convolutions have been inserted one within the other in proper angular relation.

Fig. 5 is a side elevational view of another form of the invention.

The form of the invention illustrated in Figs. 1 and 2 is constructed as follows: Upon a cylindrical mandrel not illustrated the surface of which is gradually stepped down, is first wound a group A of circular convolutions 10. The convolutions are wound about the portion of the mandrel of largest diameter and are secured together at diametrally opposite localities by means of thread or other suitable means as indicated at 11. If desired the portions of the group included between these fastenings may be cemented together in place of using said threads or the same may be cemented together in conjunction therewith. Without cutting the wire a second group B of convolutions 12 is next wound upon the adjoining stepped portion of the mandrel which are similarly secured together as indicated at 13. In the same manner another group C is wound consisting of convolutions 14 secured together at 15 and so on until as many groups as desired have been obtained. The winding thus formed is then removed from the mandrel taking the appearance shown in Fig. 3 in which it will be noted that a number of individual helical coils or groups of convolutions are formed which are interconnected to provide a single circuitous winding leaving ends 16 and 17 for attachment to suitable electrical terminals.

The groups of windings A, B and C are next inserted one within the other and arranged in angular relation to one another as clearly shown in Fig. 4. This is accomplished without breaking or disturbing the portions of the convolutions indicated at 18 and 19 which interconnect the respective groups of convolutions. When so arranged the various groups have the convolutions thereof arranged along the surface of a sphere, which group of convolutions cross each other at substantially two localities diametrally opposed to one another as indicated at 21 and 22. The various groups of convolutions upon being arranged as designated are next tied together by means of thread or secured together in any other suitable manner, as for instance by cement. The winding so constructed is in itself a completed structure without further formation and will serve in radio reception with splendid results. If, however, it be desired, the distributed capacity of the adjoining convolutions may be lessened by individually spreading apart the various convolutions 10, 12 and 14 of the groups A, B and C causing the same to bend at the fastenings 11, 13 and 15 and to take the formation illustrated in Fig. 1. When so arranged it will be noted that the portions of the convolutions lying between the fastenings 11, 13 and 15 are all parallel to one another, while the portions of said windings confined to each respective group cross the similar portions of the convolutions confined to the other groups and that the unsecured portions of the convolutions extend outwardly from the crossed portions in diverging relation and lie substantially along the surface of a sphere. The reason for winding the groups of windings upon a stepped mandrel is to form each group of a slightly smaller diameter so that when the various groups are assembled as shown in Fig. 4, and spread apart as illustrated in Fig. 1, that said windings produce a structure of substantially uniform cylindrical formation, particularly around the outer periphery of the convolutions. The variation in the diameter of these groups of convolutions is determined by the thickness of the wire used to form the winding in order that the uniformity referred to may be secured.

With the particular form of invention above described, it will be noted that where a sufficiently heavy wire is used that the winding may be constructed without the use of a permanent form and core on which to wind the same, so that the dielectric effect of such form upon the adjacent convolutions of the windings is thereby eliminated. If, however, the use of a dielectric is not objected to, the winding may be constructed as illustrated in Fig. 5. In this form of the invention a number of cylindrical or spheroidal shaped tubular forms 22 are employed which are constructed of any suitable insulating material and are made of slightly different diameters and are mounted upon a suitable mandrel for the purpose of winding the convolutions of the winding thereon. These forms may be made of sufficient width to allow the convolutions which are indicated at 23 to be wound in spaced relation thereon so that the distributed capacity of the adjoining convolutions may be thereby reduced. The various convolutions 23 are preferably cemented to the forms 24 or may be attached thereto in any other suitable manner so that the same form a rigid construction permitting the rearrangement of the groups of convolutions so formed as will now be described. In this manner a number of groups E, F, G, H, J and K may be provided which can be inserted one within the other the same as the groups A, B and C of the other form of the invention and arranged in angular relation to one another so as to cause the convolutions thereof to lie substantially along the surface of a sphere. It will be noted that with this form of the invention the various convolutions of each group are helical in formation and are equally spaced from one another throughout their extent and that the various groups cross each other at two diametrally opposed localities along the surface of the sphere as indicated at 24. This arrangement in formation of the windings is identical with that of the winding shown in Fig. 1, except that the locality where the various groups of convolutions cross each other is more extensive. This form of the invention is particularly advantageous in that the manual labor required to attach the convolutions together where they cross each other is eliminated as well as the subsequent spreading apart of the convolutions after the various groups have been arranged. If desired the width of each group of winding may be such that when the various windings have been assembled the convolutions thereof become equally spaced through the circumference of the sphere along which the same are arranged, or said groups of convolutions may be made of a width less than that required to completely fill the space along the surface of the sphere in which case the winding simulates to a certain degree that shown in Fig. 4.

Although I have illustrated but a single winding in the drawings it can readily be comprehended that two or more windings of the same formation as disclosed may be mounted one within the other, or that any other form of winding may be arranged and positioned either within or without the winding shown so as to form a suitable radio frequency transformer or other radio tuning coil. Likewise windings constructed in accordance with my invention may be mounted for rotation or movement relative to other windings by any of the well known methods without departing from the spirit of the invention.

My invention is particularly advantageous in that it provides a practical method of constructing and forming windings in which the convolutions thereof cross at substantially a single point. Where a greater number of convolutions are used in the coil it can readily become apparent that where the same are to cross each other at a single point that if the crossing were absolutely at the point the formation of the winding would be greatly distorted due to the extreme thickness of the same in such localities. By arranging the convolutions in layers as disclosed, the thickness of the coil at the points of crossing of the various groups can be reduced to a minimum. The invention provides a method in which the winding may be wound upon a mandrel permitting the windings to be constructed at a nominal cost.

Changes in the specific form of my invention, as herein disclosed, may be made within the scope of what is claimed without departing from the spirit of my invention.

Having described my invention, what I claim as new and desire to protect by Letters Patent is:

1. The method of forming electrical windings which consists in winding interconnected groups of helical convolutions and in inserting said groups one within the other in progressive angular relation.

2. The method of forming electrical windings which consists in winding interconnected groups of helical convolutions and in inserting said groups one within the other in progressive angular relation, and in spreading the individual convolutions of each group at the divergent portions of the winding.

3. The method of forming electrical windings which consists in winding groups of helical convolutions in layers, in securing the convolutions of each of said groups together at diametrally opposed portions thereof, in inserting said groups one within the other in progressive angular relation, with the secured portions thereof overlapping, and in spreading apart the unsecured portions of said convolutions.

In testimony whereof, I have signed my name to this specification.

ARTHUR J. SEYMOUR.